Figure 1:
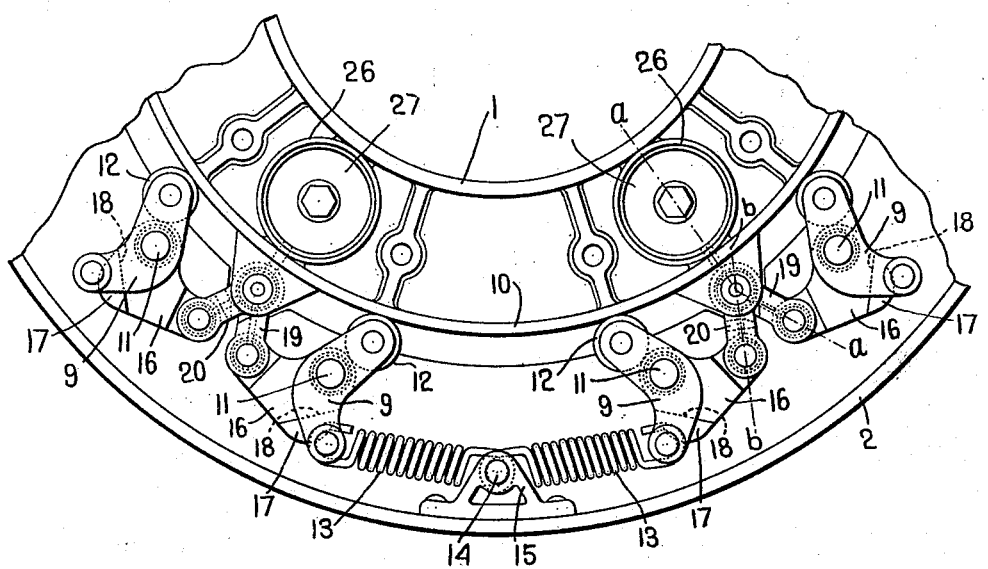

J. A. STAHLE.
LUBRICATING SYSTEM FOR CONNECTED MOVABLE PARTS.
APPLICATION FILED SEPT. 18, 1913.

1,192,012.

Patented July 25, 1916.
2 SHEETS—SHEET 1.

Witnesses.

Inventor.
John A. Stahle,
by Heard Smith & Tennant
Atty's.

J. A. STAHLE.
LUBRICATING SYSTEM FOR CONNECTED MOVABLE PARTS.
APPLICATION FILED SEPT. 18, 1913.

1,192,012.

Patented July 25, 1916.
2 SHEETS—SHEET 2.

Witnesses.
J. Morrill Fuller
Joseph D. Ashe.

Inventor.
John A. Stahle.
by Heard Smith & Tennant.
Atty's.

UNITED STATES PATENT OFFICE.

JOHN A. STAHLE, OF DORCHESTER, MASSACHUSETTS, ASSIGNOR TO STAHLE MECHANICAL TIE COMPANY, LTD., OF BOSTON, MASSACHUSETTS, A CORPORATION OF MAINE.

LUBRICATING SYSTEM FOR CONNECTED MOVABLE PARTS.

1,192,012.  Specification of Letters Patent.  Patented July 25, 1916.

Application filed September 18, 1913. Serial No. 790,560.

*To all whom it may concern:*

Be it known that I, JOHN A. STAHLE, a citizen of the United States, residing at Dorchester, county of Suffolk, State of Massachusetts, have invented an Improvement in Lubricating Systems for Connected Movable Parts, of which the following description, in connection with the accompanying drawing, is a specification, like characters on the drawing representing like parts.

This invention relates to lubricating means for connected movable parts, and particularly to a lubricating system which is well adapted for use in a device comprising inner and outer annular members concentrically arranged and a plurality of spring-actuated levers situated between said members.

In order to illustrate the invention, I have herein shown it as it might be embodied in a resilient wheel having the construction shown and described in my co-pending application Serial No. 726,507, filed Oct. 18, 1912, but I wish to state that the invention is not necessarily limited to its application to this particular type of resilient wheel but by suitable modification may be embodied in other structures having inner and outer annular members concentrically arranged and provided with pivotally-mounted spring-actuated levers which are situated between said members. The following description, however, is confined to the invention as it would be applied to a resilient wheel, such as above described, in which pivotally-mounted spring-actuated load-supporting members are interposed between the inner and outer concentrically-arranged members of a wheel or other similar device.

In carrying out my invention, I will preferably provide the members which connect the load-supporting members to one of the parts of the resilient wheel with oil ducts which communicate with an oil reservoir, said ducts being arranged to deliver the oil not only to the bearings for the load-supporting members but also to the bearings for the various intermediate connections.

Figure 2:
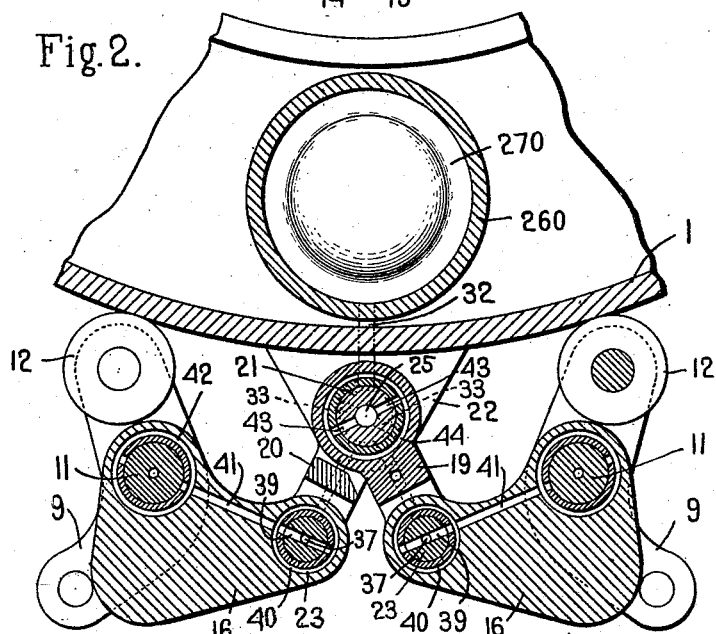
Figure 3:
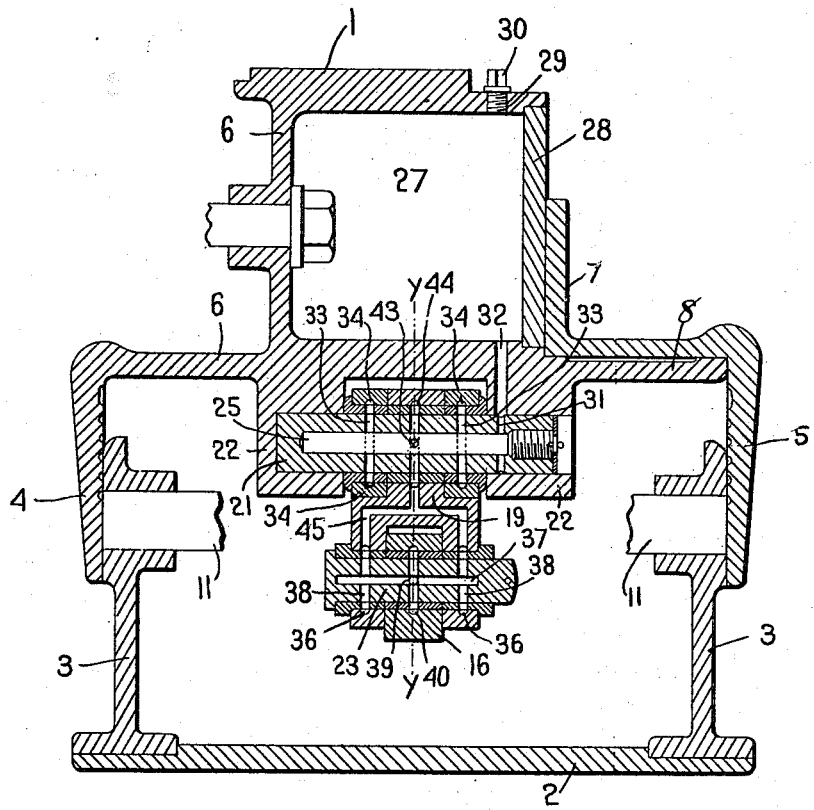
Figure 4:
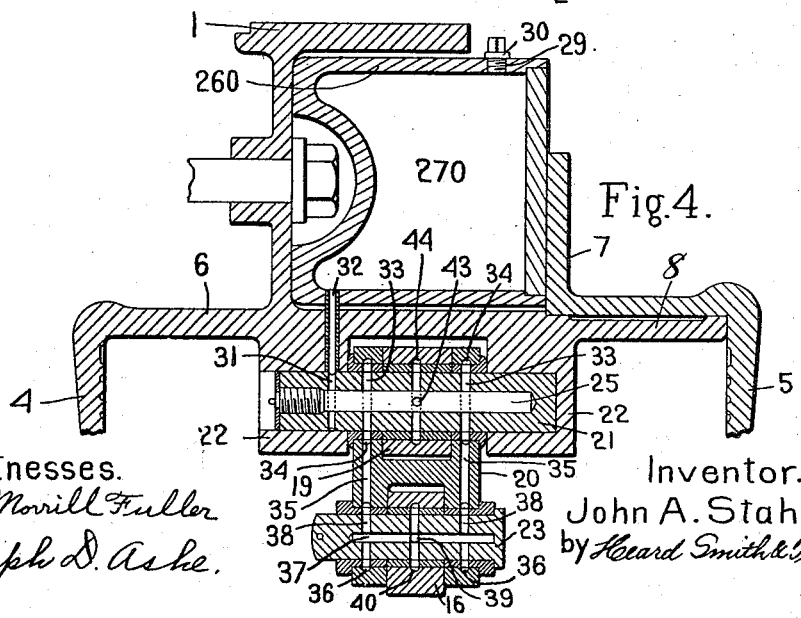

In the drawings wherein I have illustrated a selected embodiment of my invention from which the principle thereof will be readily ascertained, Figure 1 is a side view of a portion of a resilient wheel having a construction similar to that described in my co-pending application Serial No. 726,507 filed October 18, 1912, said view having the parts 7 and 3 removed to better show the interior construction. Fig. 2 is an enlarged sectional view through two load-supporting members and their connections with the wheel body, said view being taken substantially on the line *y—y*, Fig. 3. Fig. 3 is an enlarged sectional view on the line *a—a*, Fig. 1. Fig 4 is a view similar to Fig. 3 showing a slightly different construction of oil reservoir being taken on the line *b—b*, Fig. 1.

In the drawings, the wheel body is designated generally by 1 and this may have any suitable or usual construction. Situated exterior to the wheel body is an exterior rim 2 on which a tread member or tire of some suitable construction, either solid rubber or pneumatic is secured in any approved way. The exterior rim 2 is formed with side flanges 3 which extend inwardly therefrom and which overlap side flanges 4 and 5 extending outwardly from the wheel body, as clearly seen in Fig. 3 and all as described in my aforesaid co-pending application No. 726,507.

In the illustrated embodiment of my invention, the flanges 3 on the rim are received inside of the flanges 4, 5 on the wheel body, but this arrangement is not essential. The flanges 4, 5 on the wheel body are shown as secured to an annular portion 6 preferably in the form of a casting which encircles the central or body portion of the wheel body in which the usual hub is sustained. This annular portion 6 is shown as having the flange 4 integral therewith, while the flange 5 is formed on an annular ring 7 which is detachably secured to the portion 6, the latter having the laterally extending flange 8 to which the ring 7 is secured. The load on the wheel is resiliently sustained on load-supporting members 9. In the illustrated embodiment of the invention, these load-supporting members are pivotally sustained by the rim 2 and bear against the exterior face 10 of the wheel body. Said load-supporting members are shown as pivotally mounted on pivot pins 11 which are sustained in the flange 3 of the exterior rim and these load-supporting members are provided at their ends with rolls 12 which bear against the surface 10 and have springs 13 connected to their outer ends, said springs acting to turn the load-supporting members in a direction to carry the rolls 12 toward the surface 10. The load-supporting members are shown as arranged in pairs with the members of each pair oppositely disposed and the springs of each pair are shown as connected to the same anchoring pin 14 which is carried in suitable bearings 15 sustained by the rim 2.

Each load-supporting member 9 is provided with a slot or opening in its outer end in which is received a member 16 that is pivotally mounted on the pivotal pin 11 and is connected by a link to the wheel body 1. Each member 16 is provided with lateral wings 17 which are adapted to engage shoulders 18 formed on the load-supporting members 9 at certain times as will presently be described. I will preferably connect the links of the two adjacent members 16 to the wheel body 1 at the same point and for this purpose I use two links 19 and 20 which are pivotally connected to the two adjacent members 16 and both of which are pivotally mounted on the pivotal pin 21 that is supported in bearings 22 carried by the wheel body. The link 20 is forked at both ends, while the link 19 is forked at one end only. The link 19 is positioned on the pin 21 between the two branches of the forked end of the link 20 and the members 16 are received between the other forked ends of the links 19 and 20. The links 19 and 20 are connected to the members 16 by means of pivotal connecting pins 23. The construction thus far described is substantially the same as that illustrated in my co-pending application Serial No. 726,507, filed October 18, 1912, and the operation may be briefly described as follows: When the wheel is loaded, the wheel body 1 is moved downwardly relative to the rim 2 and the load supporting members 9 at the lower side of the wheel are turned against the action of the springs 13 and said springs thus operate to support the load. At the upper side of the wheel, the wheel body moves away from the rim instead of toward it and this movement brings the wings 17 of the member 16 on the shoulders 18 on the load-supporting members, thereby causing the load-supporting members to be turned about their pivots in opposition to the springs 13. All the springs 13, therefore, come into play in supporting the load. This operation is more fully described in my aforesaid co-pending application. It is desirable that the bearings for the load-supporting members and the bearings of the connections of said members and the wheel body should be lubricated, and I accomplish this end herein by providing a plurality of oil reservoirs which are carried by the wheel body and by providing oil ducts in the connections which conduct oil from the reservoirs to the parts to be lubricated. For instance, the pivotal pin 21 is made with a central chamber 25 which communicates through a port 31 with a feed duct 32 that leads to an oil reservoir. This oil reservoir may be cast integral with the annular ring 6 or may be a separate chamber secured in place.

In Figs. 1 and 3 I have shown a construction wherein the reservoir is cast integral with the annular ring 6, said ring being formed with the circular flanges 26 that project laterally therefrom and which form the oil reservoirs 27. Each reservoir is closed by the front plate 28 which is removably held in place, and each reservoir may be provided with a filling opening 29 that is closed by a suitable plug 30.

In Figs. 2 and 4, I have shown a construction wherein the oil reservoir is a separate member which is secured in place on the annular ring 6. This separate member is shown at 260 and is clamped in position by the ring 7. In either case the duct 32 leads to the oil reservoir and delivers oil therefrom to the chamber 25 of the pivotal pin 21. This pivotal pin has ports 33 extending radially thereof which lead into annular grooves 34 formed in the arms of the link 20 and said link is provided with ducts 35 which extend longitudinally thereof from the grooves 34 to other grooves 36 in the outer end of the arm in which the pin 23 has bearing. This pin 23 is also provided with a central oil chamber 37 and is formed with ports 38 which communicate with the grooves 36 so that from the oil chamber 25 oil can pass through the port 33, grooves 34, ducts 35, grooves 36 and ports 38 into the oil chamber 37. The pivotal pin 23 is provided with another radial port 39 leading to an annular groove 40 formed in the intermediate member 16 and this member is provided with an oil duct 41 which forms a communication between the groove 40 and a groove 42 which surrounds the bearing for the pivotal pin 11 and provision is thus made for the distribution of oil to the bearing surface between the load-supporting members 9 and the pivotal pin 11. The pivotal pin 21 is also provided with a port 43 leading to an annular groove 44 formed in the bearing portion of the link 19 and said link has an oil duct 45 which communicates with the groove 44 and leads to the grooves 36 surrounding the pivotal pin 23, all as above described.

I will preferably provide an oil reservoir 27 or 270 for each of the pivotal pins 21, there being, therefore, one such oil reservoir for each pair of load supporting members. With this construction it will be seen that the oil from the oil reservoirs will be transmitted through the ducts and ports above described to the bearings for the load-supporting members and also to the bearings for the connections between said members and the wheel body. All the bearings of my structure are thus constantly and automatically kept lubricated, and the oil is transmitted to the bearings through the connecting members themselves.

While I have illustrated herein a preferred embodiment of my invention, I do not wish to be limited to the constructional features shown.

Having fully described my invention, what I claim as new and desire to secure by Letters Patent is:—

1. The combination with two annular members concentrically arranged, of spring-actuated levers pivotally sustained by the outer member and adapted to bear against the inner member, hollow pivotal pins carried by the inner member, connections between said pins and said spring-actuated levers by which the latter are turned when the concentric members move radially relative to each other, each connection comprising a plurality of sections pivotally connected together and each section having an oil duct extending the length thereof, said pivotally-connected sections having at their joints means to constitute a communication between the oil ducts, and also having means constituting a communication between said ducts and the interior of said hollow pins, oil reservoirs carried by the inner member, and ducts extending from said reservoirs to the interior of said pins.

2. The combination with two annular members concentrically arranged, of a plurality of levers pivotally sustained by the outer member and bearing against the inner member, pivotal pins carried by the outer member on which said levers are mounted, hollow pivotal pins carried by the inner member, a jointed connection between each lever and a hollow pivotal pin, each jointed connection having an oil duct extending from one end to the other thereof, and also having means constituting a communication between said oil duct and the interior of the corresponding hollow pivotal pin, oil chambers carried by the inner member, and ducts forming communication between said oil chambers and the hollows of said hollow pivotal pins.

3. In a device of the class described, the combination with two annular members concentrically arranged, of a plurality of levers pivoted to the outer member and bearing against the inner member, a plurality of pivotal pins carried by the inner member, each pivotal pin having an axial chamber closed at the ends, a link pivotally mounted on each pivotal pin, each link having a duct extending longitudinally thereof, each pivotal pin having ports communicating with the ducts in the links, other links pivotally connected to the first-named links and operatively connected with the levers, said other links having oil ducts therein, each pair of links having means at the joint thereof to provide communication between the oil ducts of said links.

4. In a device of the class described, the combination with two annular members concentrically arranged, of a plurality of spring-actuated levers pivotally connected to one of said members and bearing against the other member, a plurality of hollow pivotal pins carried by said other member, a jointed connection between each hollow pivotal pin and each lever, each connection having an oil duct extending from one end to the other thereof and through the joint, and also having means constituting a communication between the oil ducts and the interior of the corresponding pivotal pin, and means to supply oil to the interior of said pivotal pin.

In testimony whereof, I have signed my name to this specification, in the presence of two subscribing witnesses.

JOHN A. STAHLE.

Witnesses:
Louis C. Smith,
Kathleen M. Scott.

Copies of this patent may be obtained for five cents each, by addressing the "Commissioner of Patents, Washington, D. C."

It is hereby certified that the name of the assignee in Letters Patent No. 1,192,012, granted July 25, 1916, upon the application of John A. Stahle, of Dorchester, Massachusetts, for an improvement in "Lubricating Systems for Connected Movable Parts," was erroneously written and printed as "Stahle Mechanical Tie Company, Ltd.," whereas said name should have been written and printed as *Stahle Mechanical Tire Company, Ltd.*, as shown by the record of assignments in this office; and that the said Letters Patent should be read with this correction therein that the same may conform to the record of the case in the Patent Office.

Signed and sealed this 5th day of September, A. D., 1916.

[SEAL.]

F. W. H. CLAY,
*Acting Commissioner of Patents.*

1. 64—17.